United States Patent [19]  [11] 4,252,928
Eve  [45] Feb. 24, 1981

[54] PROCESS FOR POLYMERIZING 1-OLEFINS WITH A CHROMIUM CATALYST AND A CATALYST MODIFIER COMPRISING AN ALIPHATIC DIENE AND A TRIHYDROCARBYL BORON

[75] Inventor: Paul L. Eve, Polmont, Scotland

[73] Assignee: BP Chemicals Limited, London, England

[21] Appl. No.: 66,629

[22] Filed: Aug. 15, 1979

[30] Foreign Application Priority Data

Aug. 19, 1978 [GB] United Kingdom ............... 33957/78

[51] Int. Cl.³ ............................................... C08F 4/24
[52] U.S. Cl. ................................... 526/106; 526/352; 526/105
[58] Field of Search ....................... 526/105, 106, 903

[56] References Cited

U.S. PATENT DOCUMENTS

| | | | |
|---|---|---|---|
| 2,898,326 | 8/1959 | Peters et al. | 526/104 |
| 3,351,623 | 11/1967 | Walker et al. | 526/105 |
| 3,484,428 | 12/1969 | Kallenbach | 526/106 |

FOREIGN PATENT DOCUMENTS

| | | |
|---|---|---|
| 50-45079 | 4/1975 | Japan . |
| 51-112890 | 10/1976 | Japan . |
| 853414 | 11/1960 | United Kingdom . |
| 886784 | 1/1962 | United Kingdom . |
| 899156 | 6/1962 | United Kingdom . |
| 1398225 | 6/1975 | United Kingdom . |

*Primary Examiner*—Stanford M. Levin
*Attorney, Agent, or Firm*—Brooks, Haidt, Haffner & Delahunty

[57] ABSTRACT

Process for polymerizing ethylene, or mixtures thereof with up to 40 wt % of other 1-olefinic monomer comprising contacting the monomer under particle form polymerization conditions at a temperature not greater than 112° C. with a catalyst prepared by heat activating chromium oxide or a compound calcinable thereto, on a refractory oxide support material and a catalyst modifier comprising an aliphatic diene and a trihydrocarbyl boron. The refractory oxide support material can be, for example silica and the heat activation is preferably carried at 400° to 900° C. The aliphatic diene preferably contains 1 to 10 carbon atoms and can be, for example butadiene, isoprene, 1,5-hexadiene, 1,7-octadiene or ethylidene norbornene. The trihydrocarbyl boron, for example trimethyl, triethyl or triisobutyl boron. The quantity of diene is preferably 10 to 5000 moles per gram atom of chromium and the quantity or trihydrocarbyl boron is preferably 0.1 to 20 moles per gram atom of chromium.

10 Claims, No Drawings

PROCESS FOR POLYMERIZING 1-OLEFINS WITH A CHROMIUM CATALYST AND A CATALYST MODIFIER COMPRISING AN ALIPHATIC DIENE AND A TRIHYDROCARBYL BORON

The present invention relates to a process for polymerizing 1-olefins.

More particularly the invention relates to a process for polymerizing 1-olefins, for example ethylene, using a modified Phillips catalyst. Phillips catalysts have been extensively described in the literature. They are formed by supporting chromium trioxide, or a compound calcinable thereto, on a refractory oxide support material, for example silica, alumina, zirconia, thoria or silica-alumina and heating in a non-reducing atmosphere, preferably an oxidizing atmosphere to produce an active polymerization catalyst. The produced catalyst is used to polymerize 1-olefins using the so-called "solution form" or "particle form" process. In the "solution form" process the monomeric 1-olefin which is normally ethylene or a mixture of ethylene with up to about 40 wt % of other 1-olefins, is contacted with a suspension of the catalyst in a liquid hydrocarbon which is a solvent for the polymer at the polymerization temperature employed. In the "particle form" process the monomeric 1-olefin is contacted with a suspension or a fluidized bed of the catalyst particles in a fluid medium under conditions such that the polymeric 1-olefin forms as solid particles suspended in or fluidized in the fluid medium. The fluid medium can be for example a liquid hydrocarbon or a gas. Examples of suitable liquid hydrocarbons are isobutane and n-pentane. Examples of suitable gases are nitrogen or argon mixed with the gaseous monomer, or the undiluted gaseous monomer.

U.S. Pat. No. 3,351,623 discloses a catalyst for polymerizing ethylene at a temperature in the range 275° to 335° F., ie, under solution form process conditions, the catalyst being one which forms on mixing (1) an oxide component selected from the group consisting of silica; mixtures of silica and alumina containing up to 25 wt % alumina; and mixtures of chromium oxide and at least one material selected from the group consisting of silica, alumina, zirconia and thoria, at least part of the chromium being in the hexavalent state at the initial contacting of the monomer therewith, (2) an organo metal component of formula $R_xM$ wherein R is selected from the group consisting of hydrogen and alkyl, aryl, cycloalkyl, alkoxy radicals and combinations of these radicals containing up to 12 carbon atoms, at least one R group being a hydrocarbon radical; M is selected from the group consisting of aluminium, gallium, indium, thallium, zinc, boron, lead, lithium, zirconium, cobalt, magnesium and tin; and x is an integer equal to the valence of M, and (3) a vanadium component selected from the group consisting of vanadium chelates and vanadyl chelates. The catalyst system and polymerization process of U.S. Pat. No. 3,351,623 are said to be applicable to the preparation of polyethylene and its copolymers which comprise greater than about 75 mole % ethylene. Such copolymers can be prepared from monomer mixtures which contain 3 to 8 carbon containing 1-olefins such as propylene, 1-butene, 1-pentene, 1-hexene, 3-methyl pentene-1, 1-octene and the like as well as conjugated olefins as butadiene and isoprene. U.S. Pat. No. 3,351,623 seeks to produce a catalyst that permits the use of high polymerization temperatures to obtain relatively low melt index polymer. It is not concerned with the use of low polymerization temperatures below 275° F.

Whilst the conventional particle form polymerization process produces polyolefins suitable for many applications, there is a need for grades of polyolefins having a high average molecular weight and broad molecular weight distribution.

It is an object of the present invention to provide a particle form process for polymerizing certain 1—olefins to polymers having increased average molecular weight and broader molecular weight distribution compared with conventional Phillips particle form processes employing unmodified Phillips catalysts.

Accordingly the present invention provides a process for polymerizing ethylene or a mixture of ethylene with up to 40% by weight of one or more other 1-olefins copolymerizable with the ethylene comprising contacting the monomer under particle form polymerization process conditions at a temperature not greater than 112° C. with a catalyst (A) prepared by supporting chromium trioxide, or a chromium compound calcinable thereto, on a refractory oxide support material and heating to a temperature at least sufficient to produce an active catalyst and a catalyst modifier (B) comprising (1) an aliphatic diene and (2) a trihydrocarbyl boron.

The monomer employed in the process of the present invention is ethylene or a mixture of ethylene with up to 40% based on the total weight of the 1-olefin content by weight of one or more other 1-olefins which are copolymerizable with the ethylene under the reaction conditions employed.

Examples of suitable other 1-olefins are propylene, 1-butene, 1-pentene, 1-hexene and 4-methyl-1-pentene.

The fluid medium employed in the particle form process conditions can be a liquid or a gas. Preferably it is a liquid. Examples of suitable liquid media are hydrocarbons which are chemically inert and non-deleterious to the modified catalyst under the reaction conditions. Preferred liquid media are paraffins or cycloparaffins having from 3–30 carbon atoms per molecule, for example isopentane, isobutane, cyclohexane. Most preferably the liquid medium is isobutane.

When a liquid medium is employed in the process of the present invention preferably the concentration of monomer therein is in the range 2–15 wt % although concentrations outside this range can be employed if desired.

The polymerization temperature employed in the process of the present invention is suitably in the range 50° to 112° C., preferably 80° to 110° C.

The polymerization pressure is preferably in the the range 2 to 100 bar when the fluid medium is a liquid and 1 to 60 bar when the fluid medium is a gas. The residence or reaction time can vary from a few minutes to several hours and is generally in the range 15 minutes to 3 hours. The particle form process can be conducted under batch or continuous polymerization conditions. Preferably the conditions are continuous. Preferred apparatus for conducting the reaction under continuous conditions in a liquid medium is described in U.K. Pat. No. 899,156.

For further details of examples of particle form process conditions and apparatus which can suitably be employed in the present invention, reference may be made to U.K. Pat. Nos. 899,156, 886,784 and 853,414.

The chromium is introduced into the catalyst of the present invention by impregnating a refractory oxide support material with chromium trioxide or a compound calcinable thereto. Examples of suitably chromium compounds are chromium sesquioxide, chromic nitrate, chromic sulphate, chromic acetate, ammonium chromate, chromium carbonate, chromyl chloride and tertiary butyl chromate. Preferred are chromium trioxide itself, chromic acetate and tertiary butyl chromate. The quantity of chromium in the final catalyst is suitably in the range 0.2 to 30 wt %. preferably 0.3 to 5.0 wt %.

Examples of suitable refractory oxides which can be employed in the process of the present invention are silica, alumina, zirconia, thoria or composites thereof, for example silica-alumina. When the refractory oxide support material employed in the present invention is silica, it preferably has a mean particle diameter in the range 20 to 150 microns; and a surface area in the range 150 to 800 square meters per gramme.

The supporting of the chromium compound on the refractory oxide support material can be achieved, for example, by dissolving a soluble chromium compound in a volatile liquid, impregnating the support material with the solution and evaporating the solvent; by impregnating the support with a liquid chromium compound, eg. chromyl chloride; by passing the vapour of a volatile chromium compond, eg. chromyl chloride, into a bed of the support material; or by mixing together a finely divided chromium compound and the support material in the presence of a small quantity of solvent, the quantity being insufficient to cause substantial agglomeration of the support material, continuing the mixing until a substantially homogeneous mix is obtained and then evaporating the solvent. Examples of solutions that can be used to impregnate the support material are chromium trioxide/water, ammonium chromate/water, chromium acetate/water, tertiary butyl chromate/hexane, chromyl chloride/chloroform.

The temperature to which the supported chromium compound must be heated to form an active polymerization catalyst (hereinafter referred to as the activation temperature) is at least 250° C. and not higher than the temperature at which the support commences to sinter. Preferably the activation temperature is in the range 400° to 900° C., most preferably 500° to 800° C. In general, the higher the activation temperature employed within the aforementioned ranges, the lower becomes the average molecular weight of polyolefin produced over the catalyst. The heating time is suitably within the range 5 minutes to 24 hours, preferably 30 minutes to 15 hours although times outside the broader range can be employed if desired.

If was formerly believed that to be an effective polymerization catalyst a "Phillips" catalyst must contain at least some chromium in hexavalent form. Whilst it is true that most, if not all, "Phillips" catalysts do contain hexavalent chromium it is now believed that the olefin polymerization catalysis may operate through chromium in valency states below 6. Nevertheless it is desirable during the heat activation of catalysts of this type, including the catalyst employed in the process of the present invention, that conditions which favor the formation of, or retention of, chromium in the higher valency states should be employed. The heat activation is preferably carried out in a non-reducing atmosphere and most preferably in an oxidizing atmosphere or in vacuo. Dry air is an example of a suitable oxidizing atmosphere. The heat activation must be performed under anhydrous or dehydrating conditions and the activated catalyst must be protected from ingress of moisture.

The catalyst modifier employed in the process of the present invention comprises two components (1) an aliphatic diene and (2) a trihydrocarbyl boron.

The aliphatic diene is suitably a conjugated or non-conjugated diene. Preferably it contains 1 to 10 carbon atoms. Most preferably at least one of the double bonds is in a terminal position. Examples of suitable dienes are butadiene, isoprene, 1,5-hexadiene, 1,4-hexadiene, 1,7-octadiene and ethylidene norbornene. Preferred dienes are butadiene and 1,5-hexadiene.

The quantity of diene employed is suitably 10 to 5000 moles, preferably 100 to 1000 moles per g atom of chromium in the catalyst.

The trihydrocarbyl boron compound is suitably any such boron compound containing up to 10 carbon atoms in each hydrocarbyl substituent. Trialkyl borons are preferred, for example trimethyl, triethyl and triisobutyl boron. Triethyl boron is particularly preferred.

The quantity of trialkyl boron employed in the process of the present invention is suitably 0.1-20 moles, preferably 0.5-10 moles per gram atom of chromium in the catalyst.

The components of the catalyst modifier can be introduced into the polymerization either together with or separately from the catalyst. When the fluid medium in which the polymerization is conducted is a liquid, the components of the catalyst modifier are preferably dissolved or suspended in some of this liquid prior to adding to the polymerization vessel.

If desired, the polymerization process of the present invention can be conducted in the presence of hydrogen gas to lower the average molecular weight of the polymer produced.

Methods of recovering polyolefins produced by particle form polymerization processes are well known in the art.

The polymerization process of the present invention is particularly useful for making polyethylene or ethylene copolymers having broad molecular weight distribution and low melt index.

The invention is illustrated by the following Examples.

EXAMPLE 1

(a) Catalyst activation 320 kg of a commercial chromia on silica catalyst (ID 969, W R Grace & Co) was heat activated in a 1.07 m diameter gas fired activator with a fluidizing air flow of 91 mm/s at about atmospheric pressure.

The temperature of activation was held at 1350° F. (732° C.) for 5 hours. The catalyst recovery was 97%. The activated catalyst was stored and handled in a dry nitrogen atmosphere.

Polymerization

Bench scale polymerization was carried out in a 2.3 liter stainless steel stirred autoclave. The reactor was purged with nitrogen, baked out for 2 hours at 110° C., then cooled to polymerization temperature. Approximately 400 mg of the catalyst prepared as described above was charged to the reactor followed by a mixture of triethyl boron (16.8 mg) and 1,5-hexadiene (3.5 g) in 1 liter of isobutane. Comparative experiments not according to the invention were carried out wherein no modifier was added (Example A) and wherein triethyl boron (16.8 mg) was added in 1 liter of isobutane (Example B).

The reactor temperature was maintained at polymerization temperature and ethylene was added to bring the total pressure in the reactor to 41.4 bar. Ethylene was added continuously throughout the run to maintain this pressure.

Polymerization and polymer property data are shown in the Table.

The Kd value is determined by a method similar to that given in Sabia, R., J. Appl. Polymer Sci., 1963, 7, 347. Kd is a measure of shear response of the polymer and, generally, Kd increases with breadth of polymer molecular weight distribution. $MI_{21.6}$ is the melt index measured by the method of ASTM 1238 using a 21.6 kg load. The units are grammes/10 minutes.

TABLE

| Example | Catalyst Modified with | Polym. Temp. (°C.) | Activity (kg/kg h) | $MI_{21.6}$ | Kd |
|---|---|---|---|---|---|
| A | (Unmodified) | 107 | 927 | 53.4 | 4.1 |
| B | Triethyl boron (42 mg/g catalyst) | 95 | 453 | 2.4 | 8.9 |
| 1 | Triethyl boron (42 mg/g catalyst) + 1,5-hexadiene (8.8 g/g catalyst) | 98 | 955 | 9.3* | 8.9* |

*After homogenization

Comparison of Example 1 (according to the invention) with comparative Examples A and B demonstrates that modification of the catalyst with trialkyl boron and diene gives polymer either of higher Kd (that is, broader molecular weight distribution) or at higher activity than can be prepared over the unmodified catalyst or the catalyst modified by trialkyl boron alone.

I claim:

1. A process for polymerizing ethylene or a mixture of ethylene with up to 40% by weight based on the total weight of the 1-olefin content of one or more other 1-olefins copolymerizable with the ethylene comprising contacting the 1-olefin(s) under particle form polymerization conditions at a temperature not greater than 112° C. with a catalyst (A) prepared by supporting chromium trioxide, or a chromium compound calcinable thereto, on a refractory oxide support material and heating to a temperature at least sufficient to produce an active catalyst, and a catalyst modifier (B) comprising (1) from about 10 to 5000 moles per gram atom of chromium of an aliphatic diene and (2) from about 0.1 to 20 moles per gram atom of chromium of a trihydrocarbyl boron.

2. A process as claimed in claim 1 wherein the particle form polymerization is conducted in a liquid hydrocarbon fluid medium.

3. A process as claimed in claim 2 wherein the liquid hydrocarbon is isobutane and the polymerization is carried out at a temperature in the range 50° to 112° C.

4. A process as claimed in claim 1 wherein the refractory oxide support material is silica.

5. A process as claimed in claim 1 wherein the heat activation of the catalyst (A) is carried out at a temperature in the range 400° to 900° C.

6. A process as claimed in claim 1 wherein the aliphatic diene contains 1 to 10 carbon atoms and wherein at least one of the double bonds is in a terminal position.

7. A process as claimed in claim 1 wherein the aliphatic diene is butadiene, isoprene, 1,5-hexadiene, 1,7-octadiene or ethylidene norborene.

8. A process as claimed in claim 1 wherein the quantity of aliphatic diene employed is in the range 100 to 1000 moles per gram atom of chromium in the catalyst.

9. A process as claimed in claim 1 wherein the trihydrocarbyl boron compound is trimethyl boron, triethyl boron or triisobutyl boron.

10. A process as claimed in claim 1 wherein the quantity of trihydrocarbyl boron employed is in the range 0.5 to 10 moles per gram atom of chromium.

* * * * *